(12) United States Patent
O'Sullivan et al.

(10) Patent No.: US 12,498,418 B1
(45) Date of Patent: Dec. 16, 2025

(54) SELF-TEST FOR RECEIVE AND TRANSMIT HARDWARE FUNCTIONAL SAFETY ASSOCIATED WITH A TOUCH PANEL OR SCREEN

(71) Applicant: Cypress Semiconductor Corporation, San Jose, CA (US)

(72) Inventors: Sean O'Sullivan, Clonakilty (IE); Cathal O'Lionaird, Cork (IE); Thorsten Piper, Frankfurt am Main (DE)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/957,070

(22) Filed: Nov. 22, 2024

(51) Int. Cl.
*G01R 31/317* (2006.01)
*G01R 31/3185* (2006.01)
*G06F 3/044* (2006.01)

(52) U.S. Cl.
CPC .......... *G01R 31/31715* (2013.01); *G01R 31/318572* (2013.01); *G06F 3/0446* (2019.05)

(58) Field of Classification Search
CPC ...... G01R 31/31715; G01R 31/318572; G06F 3/0446
See application file for complete search history.

(56) References Cited

U.S. PATENT DOCUMENTS

| | | | |
|---|---|---|---|
| 2014/0267151 A1* | 9/2014 | Ryshtun | G06F 3/0418 345/174 |
| 2016/0246428 A1* | 8/2016 | Lu | G06F 3/04166 |
| 2021/0311604 A1* | 10/2021 | Kremin | G06F 3/04166 |
| 2021/0373683 A1* | 12/2021 | Kremin | G06F 3/044 |
| 2023/0036111 A1* | 2/2023 | Lin | G09G 3/3648 |
| 2023/0072953 A1* | 3/2023 | Kidambi | H02M 1/08 |
| 2023/0100570 A1* | 3/2023 | Sadeghipour | G06F 3/0418 |

* cited by examiner

*Primary Examiner* — Amy Onyekaba (57) ABSTRACT

A device includes a signal bus to carry a sinusoidal drive signal and receive (RX) sensing hardware, coupled to an electrode of a touch panel, including an attenuator configured to detect a touch signal from the electrode, a multiplexer coupled between an input to the attenuator and the signal bus, and a capacitor coupled between the signal bus and the multiplexer. Control logic is coupled to the RX sensing hardware to perform a self-test, including to disconnect the RX sensing hardware from the electrode, cause the multiplexer to couple the capacitor to the input of the attenuator, determine whether an output of the RX sensing hardware is within a functional operating range.

20 Claims, 7 Drawing Sheets

SELF-TEST FOR RECEIVE AND TRANSMIT HARDWARE FUNCTIONAL SAFETY ASSOCIATED WITH A TOUCH PANEL OR SCREEN

TECHNICAL FIELD

Embodiments of the present invention relate to the field of user interface devices and, in particular, to self-test for receive and transmit hardware functional safety associated with a touch panel or screen.

BACKGROUND

Computing devices, such as notebook computers, personal data assistants (PDAs), and mobile handsets, have user interface devices, which are also known as human interface devices (HID). One type of user interface device that has become more common is touch-sensing devices, such as touch-sensor pads (also commonly referred to as touchpads), touch-sensor sliders, touch-sensor buttons, touch-sensor keyboard, touchscreens, and touch panels.

A basic notebook touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display.

Another user interface device that has become more common is a touch screen. Touch screens, also known as touchscreens, touch panels, or touchscreen panels are display overlays, which are typically pressure-sensitive (resistive), electrically sensitive (capacitive), acoustically sensitive (SAW-surface acoustic wave), or photo-sensitive (infrared). The effect of such overlays allows a display to be used as an input device, removing the keyboard and/or the mouse as the primary input device for interacting with the display's content. Such displays can be attached to computers or, as terminals, to networks. There are several types of touch screen technology, such as optical imaging, resistive, surface wave, capacitive, infrared, dispersive signal, and strain gauge technologies. Touch screens have become familiar in retail settings, on point-of-sale systems, automatic teller machines, mobile handsets, game consoles, and personal digital assistants. A stylus is sometimes used to manipulate the graphical user interface (GUI) and to enter data.

In general, capacitance-sensing devices are intended to replace mechanical buttons, knobs, and other similar mechanical user-interface controls. Capacitance-sensing devices eliminate the complicated mechanical switches and buttons, providing reliable operation under harsh conditions. In addition, capacitance-sensing devices are widely used in modern customer applications, providing new user interface options in the existing products. Capacitive touch sensor elements can be arranged in the form of a sensor array for a touch-sensing surface. When a conductive object, such as a finger, comes in contact or close proximity with the touch-sensing surface, the capacitance of one or more capacitive touch sensor elements changes. An electrical circuit can measure the capacitance changes of the capacitive touch sensor elements. The electrical circuit, supporting one operation mode, converts the measured capacitances of the capacitive touch sensor elements into digital values.

There are two main operational modes in the capacitance-sensing circuits: self-capacitance sensing and mutual capacitance sensing. The self-capacitance sensing mode is also called single-electrode sensing mode, as each sensor element needs only one connection wire to the sensing circuit. For the self-capacitance sensing mode, touching the sensor element increases the sensor capacitance as the finger touch capacitance is added to the sensor capacitance. The mutual capacitance change is detected in the mutual capacitance-sensing mode, also called all-points accessible mutual capacitance-sensing mode. Each sensor element uses at least two electrodes: one is a transmitter (TX) electrode (also referred to herein as transmitter electrode), and the other is a receiver (RX) electrode. When a finger touches a sensor element or is in close proximity to the sensor element, the capacitive coupling between the receiver and the transmitter of the sensor element is decreased as the finger shunts part of the electric field to ground (e.g., chassis or earth).

BRIEF DESCRIPTION OF THE DRAWINGS

The present disclosure is illustrated by way of example, and not by way of limitation, in the figures of the accompanying drawings.

DETAILED DESCRIPTION

Touch panels (e.g., touch screens) that are used in consumer electronics and automotive settings are increasingly utilizing larger screen sizes, for example, greater than 12.3 inches. At the same time, such large screen sizes are subject to Automotive Safety and Integrity (ASIL) test requirements such as ASIL-B requirements that involve run-time tests of hardware required for functional safety coverage. These specific ASIL-based tests can be generally understood as specific built-in self-tests (BISTs) for hardware employed for sensing applications related to touch panels or screens.

For example, touch sensing hardware can include a high number of complex RX and TX input/output (I/O) circuits. In order to prevent detecting false touches, these run-time tests are to run between every touch scan and cover as many I/O circuits as possible. The time allocated to run-time test per scan frame should be minimized as increased scan time leads to better signal-to-noise ratio (SNR). For designs having a high voltage TX (e.g., up to 10V or more) and standard RX (e.g., up to 5V), designing a BIST with this interface poses a risk in terms of operating within safe voltage ranges. For example, merely coupling the TX domain to the RX domain to test both (or just test the RX I/O circuit) could lead to exposing sensitive RX hardware to overly high TX voltage.

For these reasons, built-in self-tests for functional safety in RX and high-voltage TX I/O circuits in touch sensing applications should be robust, time efficient, and operate safely in a cross-domain environment. Known BISTs for functional safety in touch applications tend to suffer from lack of parallelism, e.g., separate hardware has to be tested serially, exhibit long scan time, and lack a high-voltage interface that could be employed for testing TX hardware circuits.

Aspects of the present disclosure and embodiments overcome the deficiencies above and others by including DFT hardware within each RX and TX, which includes a capacitor that models electrode capacitance, to facilitate performing a self-test on both TX hardware circuits and RX sensing hardware circuits. In embodiments, modeling capacitance can include at least mutual capacitance but also can incorporate testing self capacitance as well.

For example, in some embodiments, a device includes a signal bus to carry a sinusoidal drive signal, receive (RX) sensing hardware coupled to an electrode of a touch panel, and control logic coupled to the RX sensing hardware. In embodiments, the RX sensing hardware includes an attenuator configured to detect a touch signal from the electrode, a multiplexer coupled between an input to the attenuator and the signal bus, and a capacitor coupled between the signal bus and the multiplexer. In embodiments, the control logic performs a self-test including to disconnect the RX sensing hardware from the electrode, cause the multiplexer to couple the capacitor to the input of the attenuator, and determine whether an output of the RX sensing hardware is within a functional operating range. In some embodiments, the control logic triggers the self-test in response to detecting receipt of the touch signal, e.g., after measuring the touch signal. In response to the output not being within the functional operating range, the control logic can cease to report touch signals received from the electrode and/or generate a fault alert via the touch panel or another I/O accessible by an operator.

In at least some embodiments, the device further includes a transmission (TX) self-test bus, which has a second input to the multiplexer and a TX hardware circuit coupled to the signal bus. The TX hardware circuit can use the sinusoidal drive signal to excite the electrode of the touch panel. In embodiments, the TX hardware circuit includes an operational amplifier to drive the sinusoidal drive signal onto the electrode, a second capacitor coupled to an output of the operational amplifier, and a switch coupled between the second capacitor and the TX self-test bus. In such embodiments, the control logic, to perform the self-test on the TX hardware circuit, further closes the switch so that a TX output of the operational amplifier is transmitted over the TX self-test bus, causes the multiplexer to select the TX self-test bus to feed the TX output to the attenuator, and in response to the output of the RX sensing hardware not being within the functional operating range, generates a fault alert via the touch panel or other I/O hardware/software.

It should be noted that the capacitance-sensing circuitry can detect conductive objects and other objects (also referred to as touch objects). An object, or touch object, is any object that disturbs the electrical field and reduces the coupling between the receiver and transmitter electrodes for the capacitance sensing techniques. For example, if a user touches the touch surface wearing gloves, the capacitance-sensing circuitry may not detect the user's finger as a conductive object, but the capacitance-sensing circuitry can still detect the user's finger because the user's finger still disturbs the electrical field and reduces the coupling between the electrodes. It should also be noted that the embodiments described herein can be used on touch panels having more than two transmitter electrodes and receiver electrodes as described below. Also, the capacitance-sensing circuitry can detect a hover event of a conductive object above the touch panel.

The following description sets forth numerous specific details, such as examples of specific systems, components, methods, and so forth, in order to provide a good understanding of several embodiments of the present invention. However, it will be apparent to one skilled in the art that at least some embodiments of the present invention may be practiced without these specific details. In other instances, well-known components or methods are not described in detail or presented in a simple block diagram format to avoid unnecessarily obscuring the present invention. Thus, the specific details set forth are merely exemplary. Particular implementations may vary from these exemplary details and still be contemplated to be within the spirit and scope of the present invention.

References in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
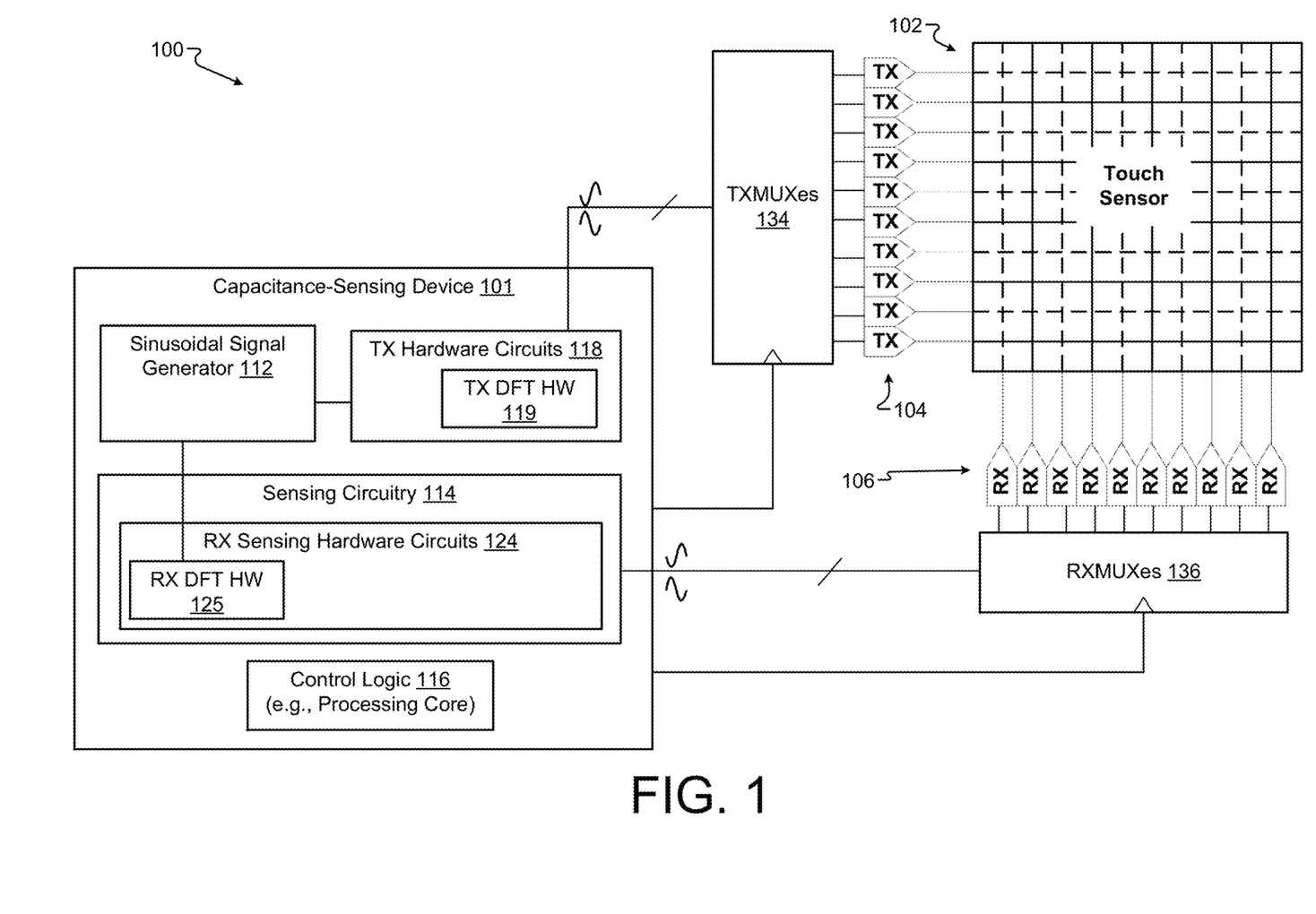
FIG. 1 is a block diagram of a system having a capacitance-sensing device with capacitance-sensing circuitry that drives a touch panel with differential or other types of sinusoidal drive signals according to some embodiments.

FIG. 1 is a block diagram of a system 100 having a capacitance-sensing device 101 with capacitance-sensing circuitry that drives a touch panel 102 with differential or other types of sinusoidal drive signals according to some embodiments. For example, the capacitance-sensing device 101 can support other capacitance-sensing modes, such as mutual capacitance or self capacitance. FIG. 1 illustrates the capacitance-sensing device 101 with a touch-controller architecture with a sensing grid (e.g., a sense panel, the touch panel 102, or a capacitance matrix) with a rectangular array of sense electrodes. The rectangular array of sense electrodes can include an integer number, M, of TX electrodes 104 and an integer number, N, of RX electrodes 106.

In one embodiment, for example, the M number of TX electrodes is between 30-50 electrodes and the N number of RX electrodes can range between 40-60 electrodes (although could include 100 RX electrodes in some embodiments). In at least one embodiment, multiplexers can connect the panel electrodes to one or more sense channels and multiplex signals between the greater number of RX electrodes and the fewer number of TX electrodes. In some embodiments, multiplexing is also between in-phase and opposite-phase TX drive signals if functioning in multi-phase TX mode. Further, the system 100 (or device 101) can include a plurality of RX multiplexers 136 coupled between the RX sensing hardware circuits 124 and the RX electrodes 106.

In some embodiments, the capacitance-sensing device 101 includes capacitance-sensing circuitry, which can be capable of one or both transmitting and receiving as will be discussed. In some embodiments, the capacitance-sensing device 101 includes a sinusoidal signal generator 112, TX hardware circuits 118, sensing circuitry 114, and control logic 116 such as one or more processing cores.

In embodiments, the sinusoidal signal generator 112 generates a sinusoidal drive signal. In at least one embodiment, the sinusoidal drive signal includes an in-phase drive signal and an opposite-phase drive signal in multi-phase TX mode, and selects an excitation sequence with a number of positive and negative ones, corresponding to the in-phase drive signals and the opposite-phase drive signals, respectively. The excitation sequence can be selected such that the sum of the excitation sequence is zero. Alternatively, the excitation sequence can be selected such that the sum is not zero. In the case where the excitation sequence has a sum of zero, the excitation sequence can be referred to as a zero-sum excitation sequence.

At the first scanning stage, the sinusoidal signal generator 112 can apply an in-phase drive signal to one or more TX electrodes 104 simultaneously and according to the excitation sequence. Also, at the first scanning stage, sinusoidal signal generator 112 can optionally apply an opposite-phase drive signal to one or more TX electrodes 104 simultaneously and according to the excitation sequence. The sinusoidal signal generator 112 can apply the in-phase drive signal and the opposite-phase drive signal to adjacent TX electrodes 104. In some embodiments, the TX hardware circuits 118 include TX DFT hardware 119 that enables performing a self-test on each respective TX hardware circuit 118, as will be described in more detail.

Further, in embodiments, the sensing circuitry 114 includes RX sensing hardware circuitry 124, each which may include RX DFT hardware 125 configured for performing a self-test on each respective RX sensing hardware circuit, as will be discussed in detail herein. For example, the RX sensing hardware circuits 124 are multiplied to provide a particular number of sensing channels corresponding to the RX electrodes 106. Each RX sensing hardware circuit 124 can include hardware configured to detect a presence of an object (such as a finger or other conductive object) on the touch panel 102 of capacitance-sensing device 101. The sense signals represent capacitances associated with the RX electrodes 106. In some embodiments, the sinusoidal drive signal generated by the sinusoidal signal generator 112 can also be used by the RX DFT hardware 125 in order to test the internal capacitance of each RX sensing hardware circuit 124 that models an electrode of the RX electrodes 106.

Figure 2A:
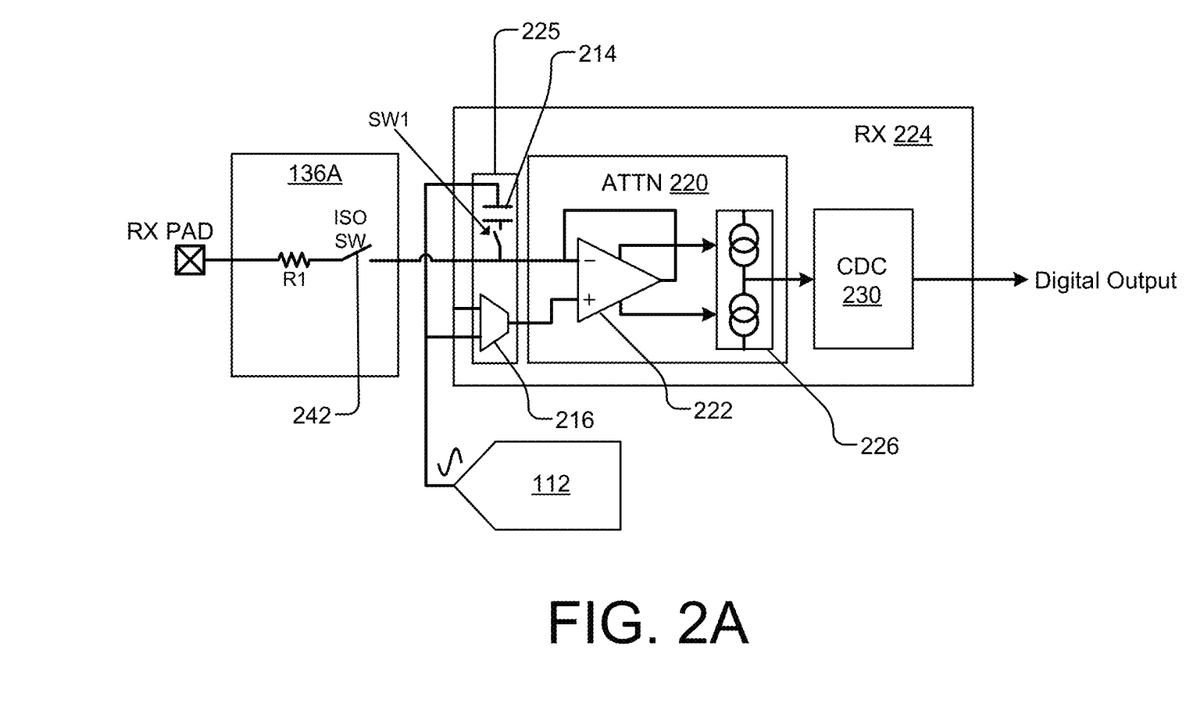
FIG. 2A is a schematic block diagram of RX design for test (DFT) hardware integrated within a RX sensing hardware circuit for running RX system self-tests according to some embodiments.

FIG. 2A is a schematic block diagram of RX design for test (DFT) hardware integrated within an RX sensing hardware circuit 224 for running RX system self-tests according to some embodiments. In embodiments, the RX sensing hardware circuit 224 is one of the RX sensing hardware circuits 124 (FIG. 1) and is coupled to an RX multiplexer 136A that is in turn coupled to an RX pad of a particular RX electrode, e.g., RX electrode 106.

The RX sensing hardware circuit 224 can include RX sensing hardware such as an attenuator 220 configured to detect a touch signal from the RX electrode 106 and a capacitance-to-digital converter or CDC 230, coupled to the current attenuator 220, to generate a digital output signal indicative of an output current level of the attenuator 220. In embodiments, the attenuator 220 includes an operational amplifier 222 coupled to a current mirror 226, where the current mirror 226 modifies a current level of the touch signal (e.g., steps down the current) received from the operational amplifier 222. Thus, the modified current can be provided to the CDC 230 to generate a digital output signal indicative of an output current level of the current mirror 226.

In some embodiments, the RX sensing hardware further includes RX DFT hardware 225 coupled between the sinusoidal signal generator 112 and the attenuator 220. In embodiments, the RX DFT hardware 225 includes a multiplexer 216 coupled between an input to the attenuator 220 (e.g., a positive terminal of the operational amplifier 222) and the sinusoidal signal generator 112. In this way, the multiplexer 216 can be controlled to select the sinusoidal drive signal from the sinusoidal signal generator 112 or a regular reference signal for use during non-self-test normal operation of sensing the RX electrode 106.

The RX DFT hardware 225 can further include a capacitor 214 and a first switch (SW1) serially coupled between the sinusoidal signal generator 112 and the negative terminal of the operational amplifier 222, where the negative terminal also receives feedback from the output of the operational amplifier 222. In the present context, the operational amplifier 222 can generate a current signal indicative of a difference between the current from the capacitor 214 and the reference drive signal. Thus, in present embodiments, the sinusoidal signal generator 112 acts as a transmitter and the capacitor 214 acts as a panel mutual capacitance for purposes of self-test. By exciting a voltage on the capacitor, the resulting charge can be measured by running a mutual capacitance scan.

In embodiments, the RX multiplexer 136A includes an electrostatic discharge (ESD) resistor (R1) coupled in series with an isolation switch 242. For example, the isolation switch 242 can be coupled between the RX electrode 106 and the RX sensing hardware.

In embodiments, the control logic 116 is coupled to the RX sensing hardware of the RX sensing hardware circuit 224. The control logic 116 can perform (or direct performance of) a self-test of the RX sensing hardware circuit 224, which includes triggering the self-test in response to detecting receipt of the touch signal, e.g., after the touch signal of the RX electrode 106 is detected, to prevent detecting false touches. The control logic can further disconnect the RX sensing hardware from the electrode (e.g., by opening the isolation switch 242), cause the first switch (SW1) to couple the capacitor 214 to the input of the attenuator 220, and determine whether an output of the RX sensing hardware (e.g., the digital output) is within a functional operating range. This determination can be performed by comparing the digital output to a predefined threshold limit stored or buffered in memory of the system 100. In response to the output not being within the functional operating range, the control logic 116 can cease to report touch signals received from the electrode (e.g., the RX electrode 106) or generate a fault alert via the touch panel 102 or another I/O of the system 100.

Figure 2B:
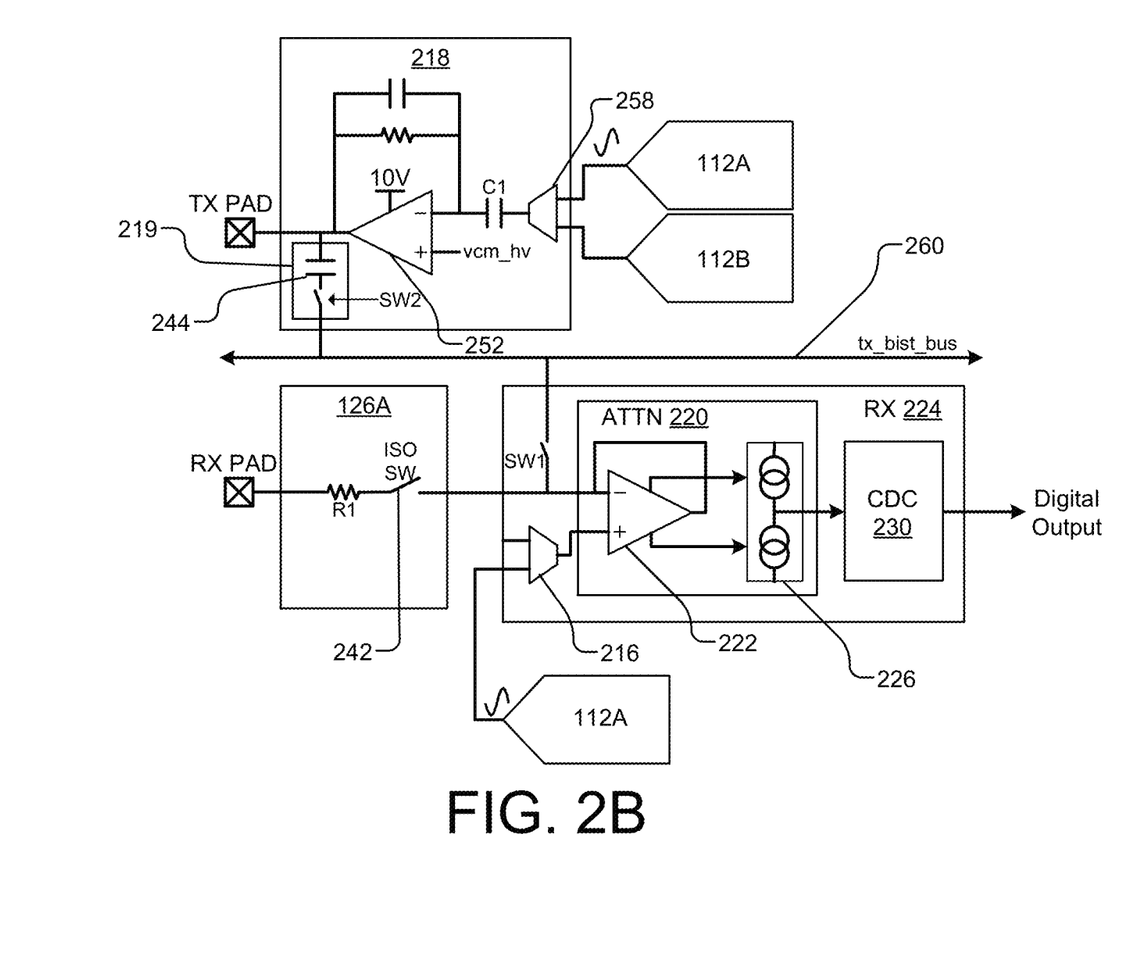
FIG. 2B is a schematic block diagram of TX DFT hardware integrated within a TX hardware circuit for running TX system self-tests according to some embodiments.

FIG. 2B is a schematic block diagram of TX DFT hardware 219 integrated within a TX hardware circuit 218 for running TX system self-tests according to some embodiments. Note that the components of FIG. 2A are generally replicated here to illustrate how the TX system self-test can also employ (or link into) the RX sensing hardware circuit 224 to perform the self-test. In embodiments, the TX hardware circuit 218 is coupled between a first sinusoidal signal generator 112A and a second sinusoidal signal generator 112B and a TX pad, which is in turn coupled to a TX electrode 104.

In some embodiments, the TX hardware circuit 218 includes a multiplexer 258 for selecting between the first and second sinusoidal signal generators 112A and 112B and having an output coupled to a capacitor (C1). The TX hardware circuit 218 can further include an operational amplifier 252, coupled to the TX pad, having the negative terminal AC-coupled to the capacitor C1 and a positive terminal coupled to a high-voltage common mode voltage (vcm_hv) as a reference voltage.

In at least some embodiments, the system 100 (FIG. 1) includes a transmitter self-test bus 260 that is added in order to provide an output of the TX hardware circuit 218, during TX system self-test, to the input of the attenuator 220. How this is done will be discussed in more detail with reference to FIG. 3B. In embodiments, the TX DFT hardware 219 includes a capacitor 244 coupled inline with a second switch (SW2) between the output of the operational amplifier 252 and the TX self-test bus 260.

Thus, to perform the self-test on the TX hardware circuit 218, the control logic 116 can further close the second switch SW2 so that a TX output of the operational amplifier 252 is transmitted over the TX self-test bus 260. Further, the control logic 116 can close the first switch (SW1) so that RX sensing hardware circuit 224 selects the TX self-test bus to feed the TX output to the attenuator 220. In response to the output of the RX sensing hardware not being within the functional operating range, the control logic 116 can cease to report touch signals received from the electrode (e.g., the RX electrode 106) or generate a fault alert via the touch panel 102 or another I/O of the system 100.

Figure 3A:
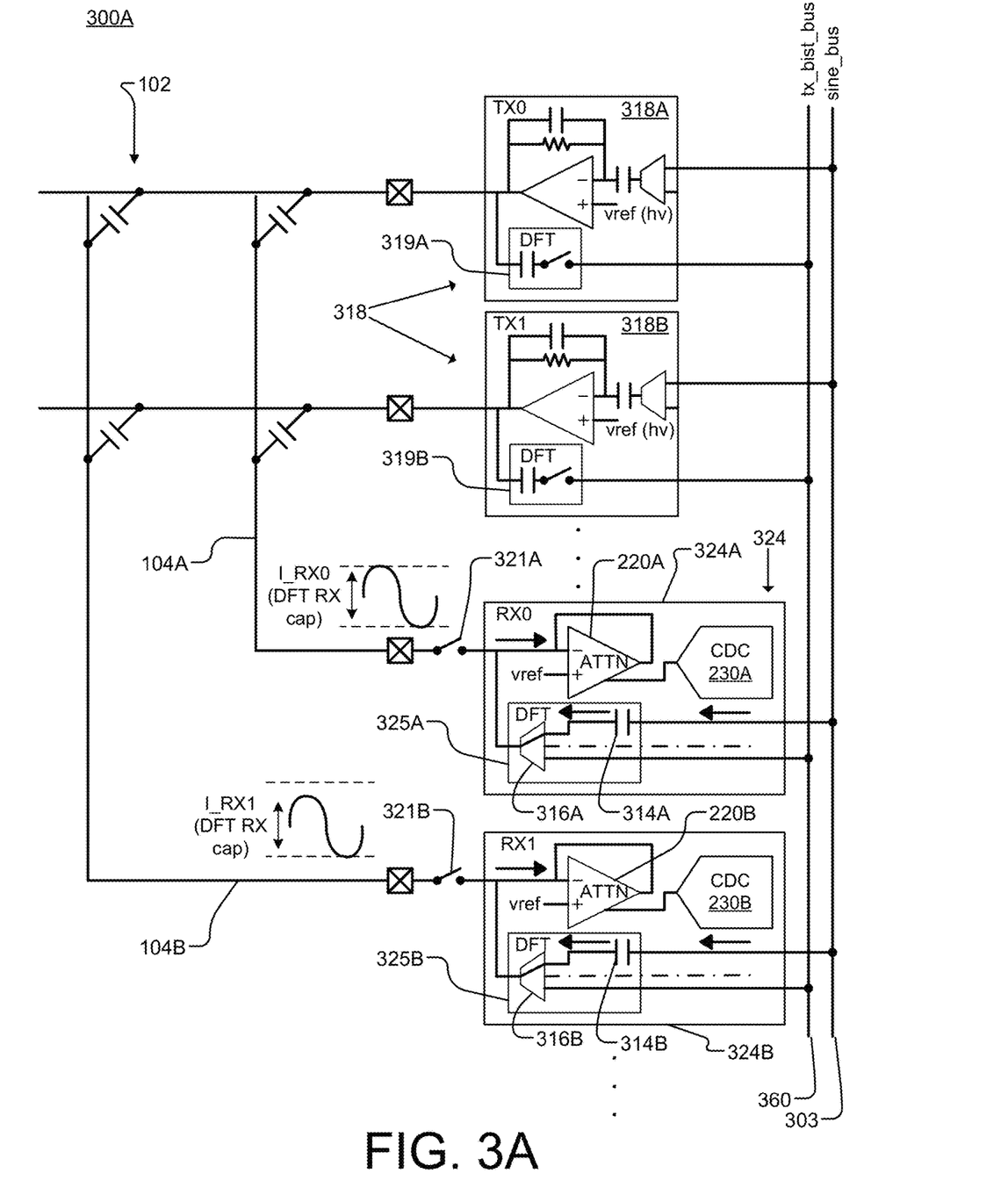
FIG. 3A is a schematic block diagram of a system (or device) having multiple transmitters and receivers that include the DFT hardware operating in an RX self-test mode according to some embodiments.

FIG. 3A is a schematic block diagram of a system 300A (or device) having multiple transmitters and receivers that include the DFT hardware operating in an RX self-test mode according to some embodiments. For example, the system 300A can include a plurality of TX hardware circuits 318 and a plurality of RX sensing hardware circuits 324, but only a first TX hardware circuit 318A and a second TX hardware circuit 318B for the former and a first RX sensing hardware circuit 324A and a second RX sensing hardware circuit 324B for the latter are illustrated to simplify the discussion. In embodiments, each RX sensing hardware circuit 324 can include the RX sensing hardware (such as discussed with reference to FIG. 2B) and coupled to a different electrode of the touch panel 102.

In embodiments, the system 300A includes a signal bus 303 to carry the sinusoidal drive signal generated by the sinusoidal signal generator 112 and a TX self-test bus 360 to facilitate linking the RX sensing hardware circuits 324 to respective ones of the TX hardware circuits 318 to facilitate the TX system self-tests as will be explained in more detail with reference to FIG. 3B. In embodiments, each of the TX hardware circuits 318 are configured as was discussed with reference to the TX hardware circuit 218, e.g., the first TX hardware circuit 318A includes first TX DFT hardware 319A and the second TX hardware circuit 318B includes second TX DFT hardware 319B.

In some embodiments, the first RX sensing hardware circuit 324A includes a first attenuator 220A coupled to a first CDC 230A and first RX DFT hardware 325A coupled between: i) the signal bus 303 and the TX self-test bus 360; and ii) the negative terminal of the first attenuator 220A. The negative terminal of first attenuator 220A can also be coupled to a first switch 321A coupled to a pad of a first RX electrode 104A. In embodiments, the first RX DFT hardware 325A includes a first multiplexer 316A, having an output coupled to the first attenuator 220A, and a first capacitor 314A coupled between the signal bus 303 and an input to the first multiplexer 316A. In embodiments, the TX self-test bus 360 is also coupled to another input to the first multiplexer 316A. In some embodiments, the first multiplexer 316A includes a third input coupled to a second TX self-test bus (illustrated in concatenated dashed line) that can be coupled to at least a second TX hardware circuit (or more).

In such embodiments, the second RX sensing hardware circuit 324B includes a second attenuator 220B coupled to a second CDC 230B and second RX DFT hardware 325B coupled between: i) the signal bus 303 and the TX self-test bus 360; and ii) the negative terminal of the second attenuator 220B. The negative terminal of second attenuator 220B can also be coupled to a second switch 321B coupled to a pad of a second RX electrode 104B. In embodiments, the second RX DFT hardware 325B includes a second multiplexer 316B, having an output coupled to the second attenuator 220B, and a second capacitor 314B coupled between the signal bus 303 and an input to the second multiplexer 316B. In embodiments, the TX self-test bus 360 is also coupled to another input to the second multiplexer 316B. In some embodiments, the second multiplexer 316B includes a third input coupled to the second TX self-test bus (illustrated in concatenated dashed line) that can be coupled to at least a second TX hardware circuit (or more).

For purposes of explanation, functionality of the first RX sensing hardware circuit 324A will be described in additional detail, but is representative any of the plurality of RX sensing hardware circuits 324. In embodiments, the first attenuator 324A is configured to detect a touch signal from the first RX electrode 104A, which is coupled to the first RX sensing hardware circuit 324A. In embodiments, the first multiplexer 316A is coupled between an input to the first attenuator 220A and the signal bus 303. In embodiments, the first capacitor 314A is coupled between the signal bus 303 and the first multiplexer 316A, e.g., an input to the first multiplexer 316A.

With continued reference to the plurality of RX hardware circuits 324, the control logic 116 (or other processing device) can trigger the RX self-test in response to any of the plurality of RX sensing hardware circuits 324 detecting receipt of a touch signal from an RX electrode e.g., after the touch signal is measured. In embodiments, self-tests of the RX hardware circuits 324 can be performed in parallel, but the following self-test is described only with reference to the first RX sensing hardware circuit 324A for purposes of explanation.

For example, to perform the RX self-test, the control logic 116 can further disconnect the RX sensing hardware from the first RX electrode 104A, e.g., by opening (or causing to be opened) the first switch 321A. The control logic 116 can further cause the first multiplexer 325A to couple the first capacitor 314A to the input of the attenuator 220A. The control logic 116 can further determine whether an output of the first RX sensing hardware 324A is within a functional operating range, e.g., based on a digital output from the first CDC 230A. For example, in response to the output not being within the functional operating range, the control logic 116 can cease to report touch signals received from the first RX electrode 104A or generate a fault alert via the touch panel 102. This type of RX self-test can be replicated, in parallel, on the plurality of RX sensing hardware circuits 324.

Figure 3B:
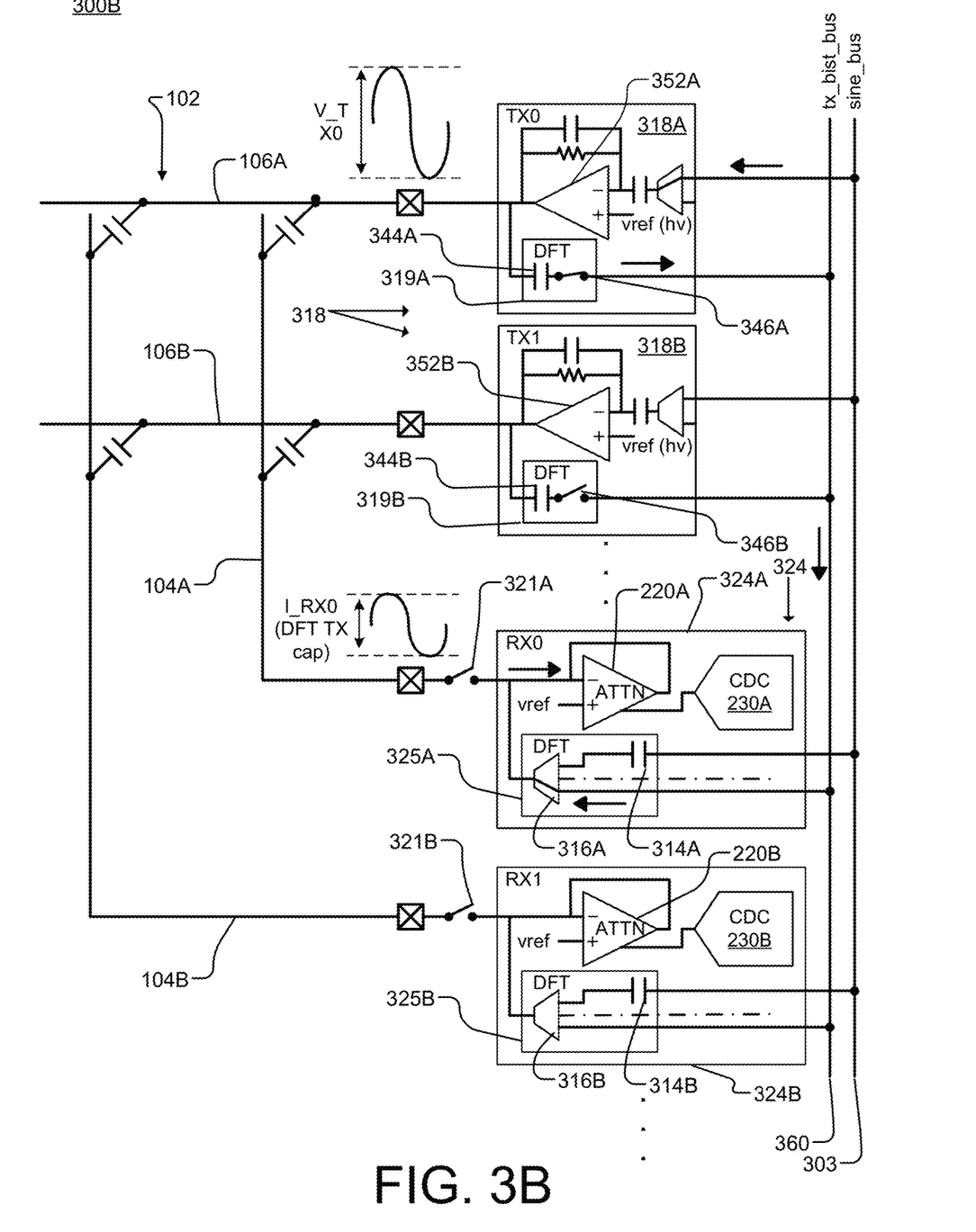
FIG. 3B is a schematic block diagram of a system (or device) having multiple transmitters and receivers that include the DFT hardware operating in a TX self-test mode according to some embodiments.

FIG. 3B is a schematic block diagram of a system 300B (or device) having multiple transmitters and receivers that include the DFT hardware operating in a TX self-test mode according to some embodiments. Building on the description of FIG. 3A and the TX hardware circuit-specific description of FIG. 2B, each of the first hardware circuit 318A and the second TX hardware circuit 318B is coupled to the signal bus 303 and configured to use the sinusoidal drive signal from the signal bus 303 to excite a coupled electrode of the touch panel 102, e.g., respectively a first TX electrode 106A and a second TX electrode 106B.

In embodiments, the first TX hardware circuit 318A includes the first TX DFT hardware 319A coupled between the TX self-test bus 360 and an output of a first operational amplifier 452A. In some embodiments, the first TX DFT hardware 319A includes a second capacitor 344A coupled to an output of the first operational amplifier 352A and a first switch 346A coupled between the second capacitor 344A and the TX self-test bus 360.

In embodiments, the second TX hardware circuit 318B includes the second TX DFT hardware 319B coupled between the TX self-test bus 360 and an output of a second operational amplifier 352AB. In some embodiments, the second TX DFT hardware 319B includes another second capacitor 344B coupled to an output of the second operational amplifier 352B and a second switch 346B coupled between the second capacitor 344B and the TX self-test bus 360.

In at least some embodiments, when a self-test is triggered, each TX hardware circuit 318 performs a self-test, as will be described with reference to the first TX hardware circuit 318A for purposes of explanation. That said, at least some of the TX self-tests can be performed in parallel given sufficient multiplexing and TX self-test buses available to additional RX sensing hardware circuits, which complete each self-test. For example, to perform a TX self-test on the first TX hardware circuit 318A, the control logic 116 closes the first switch 346A so that a TX output of the first operational amplifier 352A is transmitted over the TX self-test bus 360. The control logic 116 can cause the first multiplexer 316A (of the first RX sensing hardware circuit 324A) to select the TX self-test bus 360 to feed the TX output to the first attenuator 220A. In response to the output of the RX sensing hardware (of the first RX sensing hardware circuit 324A) not being within the functional operating range, the control logic 116 can generate a fault alert via the touch panel 102 or cease to report touch signals received from the first TX electrode 106A.

Figure 4A:
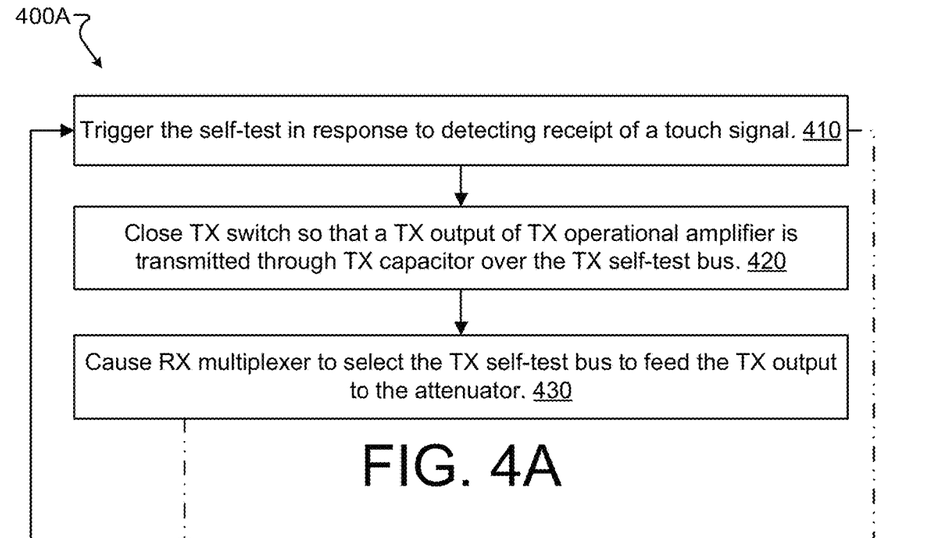
FIG. 4A is a flow diagram of an embodiment of a method for performing a TX self-test in touch-sensing devices according to some embodiments.

FIG. 4A is a flow diagram of an embodiment of a method 400A for performing a TX self-test in touch-sensing devices according to some embodiments. Method 400A can be performed by processing logic comprising hardware, firmware, or any combination thereof. Method 400A can be performed by the capacitance-sensing device 101 of FIG. 1 and/or by the system 100, as modified by circuitry illustrated in FIGS. 2A-3B.

At operation 410, the processing logic triggers a TX self-test in response to detecting receipt of a touch signal, e.g., after the touch signal is measured.

At operation 420, the processing logic closes a TX switch so that a TX output of the TX operational amplifier (in the TX hardware circuit) is transmitted through a TX capacitor (of the TX DFT hardware) over the TX self-test bus.

At operation 430, the processing logic causes the RX multiplexer (of the RX DFT hardware) to select the TX self-test bus to feed the TX output to the attenuator of the RX sensing hardware circuit.

Figure 4B:
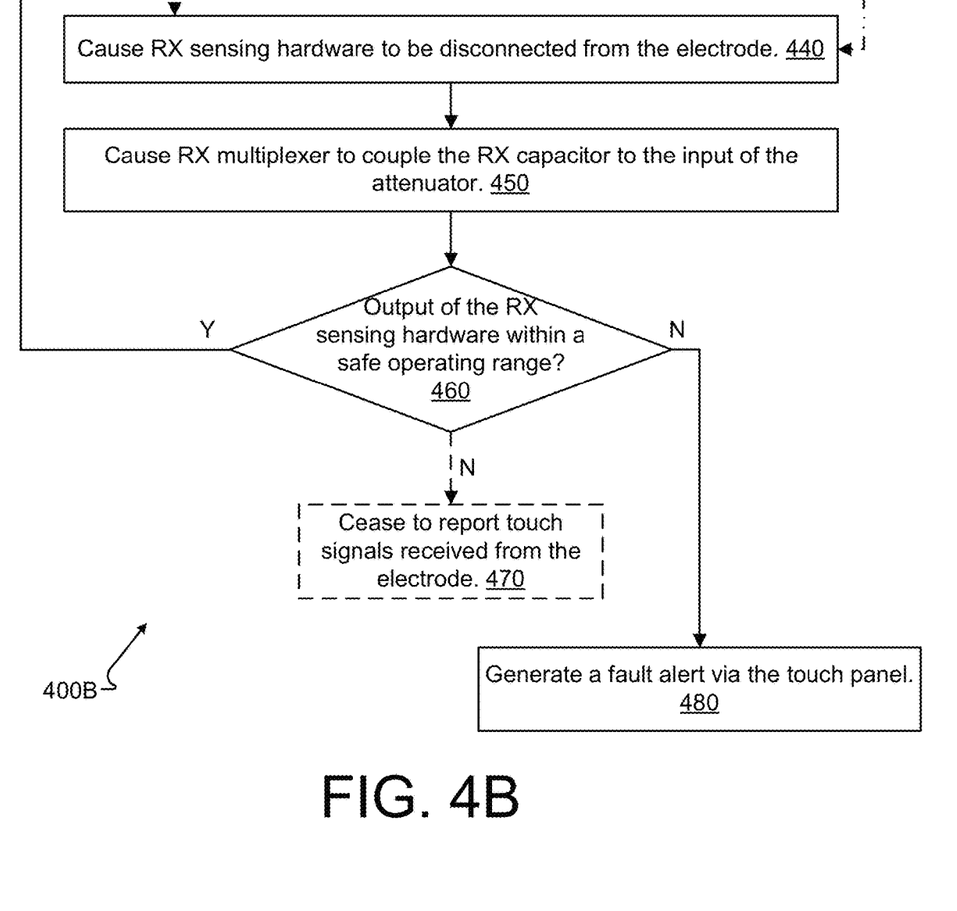
FIG. 4B is a flow diagram of an embodiment of a method for performing a TX self-test in touch-sensing devices according to some embodiments.

FIG. 4B is a flow diagram of an embodiment of a method 400B for performing a TX self-test in touch-sensing devices according to some embodiments. Method 400B can be performed by processing logic comprising hardware, firmware, or any combination thereof. Method 400B can be performed by the capacitance-sensing device 101 of FIG. 1 and/or by the system 100, as modified by circuitry illustrated in FIGS. 2A-3B. In embodiments, the method 400A relies also on the method 400B, since testing TX hardware in TX hardware circuits coupled to TX electrodes also employs one or more RX sensing hardware circuits. In other embodiments, the operations of method 400B are performed separately by each respective RX sensing hardware circuit to perform an RX self-test on the RX sensing hardware.

At operation 440, the processing logic causes the RX sensing hardware to be disconnected from the electrode, e.g., the RX electrode to which the RX sensing hardware is coupled.

At operation 450, the processing logic causes the RX multiplexer (e.g., of RX DFT hardware) to couple the RX capacitor to the input of the attenuator of the RX sensing hardware.

At operation 460, the processing logic determines whether an output of the RX sensing hardware is within a functional operating range. For example, the output of the CDC is a digital value, which can be compared with a predefined threshold limit stored or buffered in memory of the system 100. If yes, the digital output value is within the functional operating range (or satisfied the predefined threshold limit), the method 400B can loop back to monitor for detection of any touch signals to restart self-test procedures.

At operation 470, in response to the digital output value not being within the functional operating range, the processing logic optionally ceases to report touch signals received from the RX electrode (or TX electrode) depending which was being tested through coupled hardware.

At operation 480, in response to the digital output value not being within the safe operating range, the processing logic generates a fault alert via the touch panel or some other I/O hardware or software accessible by an operator.

Figure 5:
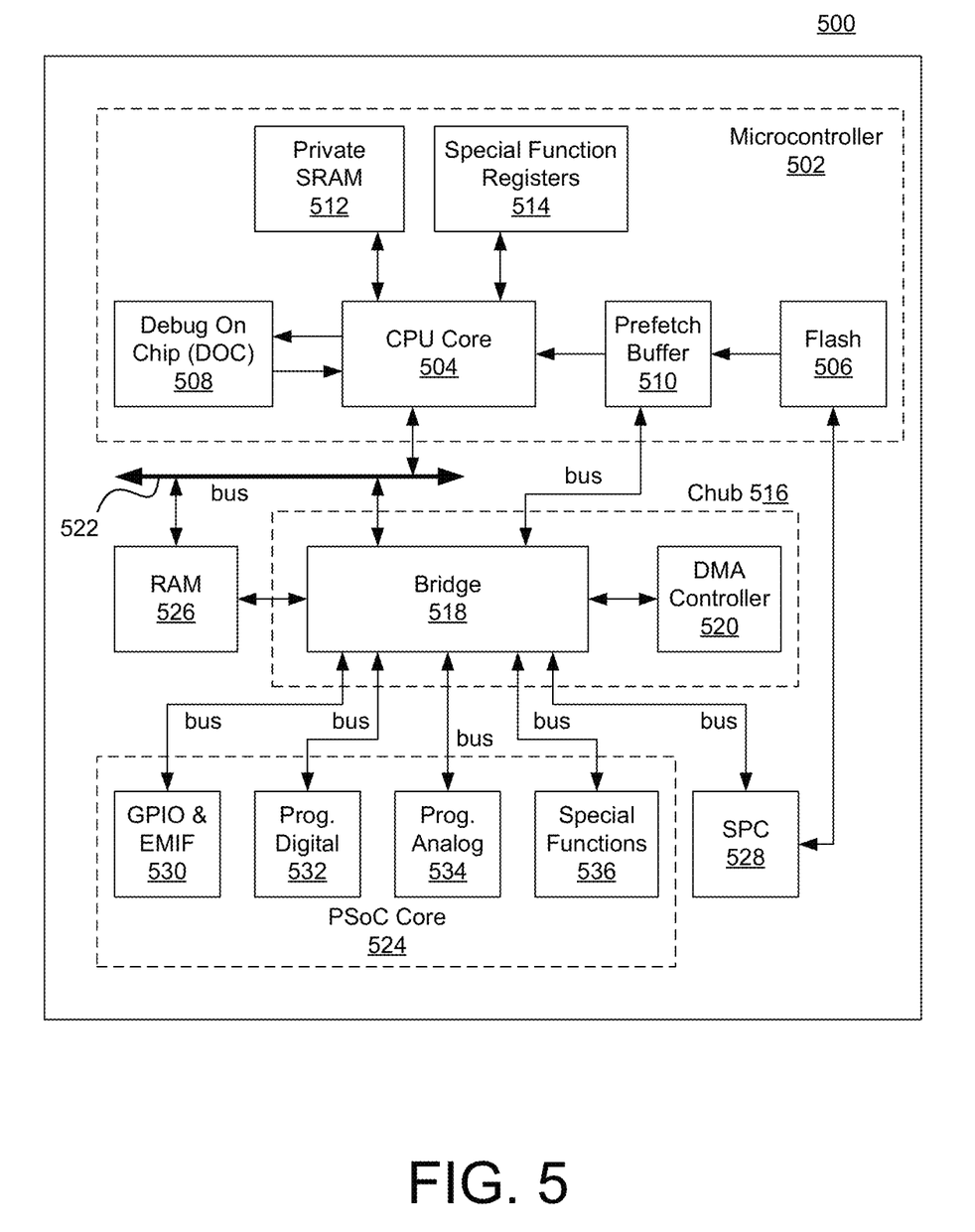
FIG. 5 illustrates an embodiment of a core architecture of the PSoC® processing device, such as that used in the PSoC3® family of products offered by Cypress Semiconductor Corporation (San Jose, California).

FIG. 5 illustrates an embodiment of a core architecture 500 of the PSoC® processing device, such as that used in the PSoC3® family of products offered by Cypress Semiconductor Corporation (San Jose, California). In one embodiment, the core architecture 500 includes a microcontroller 502. The microcontroller 502 includes a CPU (central processing unit) core 504, flash program storage 506, DOC (debug on-chip) 508, a prefetch buffer 510, a private SRAM (static random access memory) 512, and special functions registers 514. In an embodiment, the DOC 508, prefetch buffer 510, private SRAM 512, and special function registers 514 are coupled to the CPU core 504, while the flash program storage 506 is coupled to the prefetch buffer 510.

The core architecture 500 may also include a CHub (core hub) 516, including a bridge 518 and a DMA controller 520 coupled to the microcontroller 502 via bus 522. The CHub 516 may provide the primary data and control interface between the microcontroller 502 and its peripherals and memory, and a programmable core 524. In one embodiment, the timing control circuitry of FIG. 4 may be implemented in the core architecture 500, such as part of the programmable core 524. The DMA controller 520 may be programmed to transfer data between system elements without burdening the CPU core 504. In various embodiments, each of these subcomponents of the microcontroller 502 and CHub 516 may be different with each choice or type of CPU core 504. The CHub 516 may also be coupled to a shared SRAM 526 and an SPC (system performance controller) 528. The private SRAM 512 is independent of the shared SRAM 526 accessed by the microcontroller 502 through the bridge 518. The CPU core 504 accesses the private SRAM 512 without going through the bridge 518, thus allowing local register and RAM accesses to occur simultaneously with DMA access to shared SRAM 526. Although labeled here as SRAM, these memory modules may be any suitable type of a wide variety of (volatile or non-volatile) memory or data storage modules in various other embodiments.

In various embodiments, the programmable core 524 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 524 includes a GPIO (general purpose IO) and EMIF (extended memory interface) block 530 to provide a mechanism to extend the external off-chip access of the microcontroller 502, a programmable digital block 532, a programmable analog block 534, and a special functions block 536, each configured to implement one or more of the subcomponent functions. In various embodiments, the special functions block 536 may include dedicated (non-programmable) functional blocks and/or include one or more interfaces to dedicated functional blocks, such as USB, a crystal oscillator drive, JTAG, and the like.

The programmable digital block 532 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital block 532 may be configured to perform various digital functions, including, but not limited to, one or more of the following functions: a basic I2C slave; an I2C master; an SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level-sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 504) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× over-sampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 534 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 534 may support various analog functions including, but not limited to, analog routing, LCD drive IO support, capacitance-sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

It should be noted that the embodiments described above use an in-phase signal, opposite phase signal, and a reference signal. The in-phase and opposite phases may be used when using inverters or complementary output stages to generate these signals. Also, the in-phase and opposite phase signals may be used for simplifying the measurement by the ADC as +1 or −1 data signs. However, in other embodiments, different arbitrary phase signals may be used. For example, an in-phase signal and one or more out-of-phase signals may be used.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time-multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other forms of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A device comprising:
   a signal bus to carry a sinusoidal drive signal;
   receive (RX) sensing hardware coupled to an electrode of a touch panel, wherein the RX sensing hardware comprises:
      an attenuator configured to detect a touch signal from the electrode;
      a multiplexer coupled between an input to the attenuator and the signal bus; and
      a capacitor coupled between the signal bus and the multiplexer; and
   control logic coupled to the RX sensing hardware, the control logic to perform a self-test comprising to:
      disconnect the RX sensing hardware from the electrode;
      cause the multiplexer to couple the capacitor to the input of the attenuator; and
      determine whether an output of the RX sensing hardware is within a functional operating range.

2. The device of claim 1, wherein the control logic is also coupled to the touch panel and is further to:
   trigger the self-test in response to detecting receipt of the touch signal; and
   in response to the output not being within the functional operating range, at least one of:
      cease to report touch signals received from the electrode; or
      generate a fault alert via the touch panel.

3. The device of claim 1, wherein the attenuator comprises an operational amplifier coupled to a current mirror, wherein the current mirror is to modify a current level of the touch signal, and wherein the RX sensing hardware further comprises a capacitance-to-digital converter, coupled to the current mirror, to generate a digital output signal indicative of an output current level of the current mirror.

4. The device of claim 1, further comprising a switch coupled between the electrode and the RX sensing hardware, wherein, to disconnect the RX sensing hardware from the electrode, the control logic is to open the switch.

5. The device of claim 1, further comprising a plurality of RX sensing hardware circuits, each comprising the RX sensing hardware and coupled to a different electrode of the touch panel, wherein the control logic is further to, in response to any of plurality of RX sensing hardware circuits detecting the touch signal, for each RX sensing hardware circuit, in parallel:
   disconnect the RX sensing hardware from a coupled electrode;
   cause the multiplexer to couple the capacitor to the input of the attenuator to perform the self-test; and
   determine whether the output of the RX sensing hardware is within the functional operating range.

6. The device of claim 1, further comprising:
   a transmission (TX) self-test bus, which comprises a second input to the multiplexer; and
   a TX hardware circuit coupled to the signal bus and to use the sinusoidal drive signal to excite the electrode of the touch panel, wherein the TX hardware circuit comprises:
      an operational amplifier to drive the sinusoidal drive signal onto the electrode;
      a second capacitor coupled to an output of the operational amplifier; and
      a switch coupled between the second capacitor and the TX self-test bus.

7. The device of claim 6, wherein the control logic, to perform the self-test on the TX hardware circuit, is further to:
   close the switch so that a TX output of the operational amplifier is transmitted over the TX self-test bus;
   cause the multiplexer to select the TX self-test bus to feed the TX output to the attenuator; and
   in response to the output of the RX sensing hardware not being within the functional operating range, generate a fault alert via the touch panel.

8. The device of claim 6, wherein the multiplexer also receives, as a third input, a second TX self-test bus that is coupled to at least a second TX hardware circuit.

9. A system comprising:
   a sinusoidal signal generator that generates, over a signal bus, a sinusoidal drive signal;
   a touch panel comprising a plurality of electrodes to be excited by the sinusoidal drive signal;
   receive (RX) sensing hardware coupled to an electrode of the plurality of electrodes, wherein the RX sensing hardware comprises:
      an attenuator configured to detect a touch signal from the electrode;
      a multiplexer coupled between an input to the attenuator and the signal bus; and
      a capacitor coupled between the signal bus and the multiplexer; and
   control logic coupled to the RX sensing hardware, the control logic to perform a self-test comprising to:
      disconnect the RX sensing hardware from the electrode;
      cause the multiplexer to couple the capacitor to the input of the attenuator; and
      generate a fault alert, via the touch panel, in response to an output of the RX sensing hardware not being within a functional operating range.

10. The system of claim 9, wherein the control logic is further to:
   trigger the self-test in response to detecting receipt of the touch signal; and
   determine whether an output of the sensing hardware is within a functional operating range.

11. The system of claim 9, wherein the attenuator comprises an operational amplifier coupled to a current mirror, wherein the current mirror is to modify a current level of the touch signal, and wherein the RX sensing hardware further comprises a capacitance-to-digital converter, coupled to the current mirror, to generate a digital output signal indicative of an output current level of the current mirror.

12. The system of claim 9, further comprising a switch coupled between the electrode and the RX sensing hardware, wherein, to disconnect the RX sensing hardware from the electrode, the control logic is to open the switch.

13. The system of claim 9, further comprising a plurality of RX sensing hardware circuits, each comprising the RX sensing hardware and coupled to a different electrode of the plurality of electrodes, wherein the control logic is further to, in response to any of plurality of RX sensing hardware circuits detecting the touch signal, for each RX sensing hardware circuit:
  disconnect the RX sensing hardware from a coupled electrode;
  cause the multiplexer to couple the capacitor to the input of the attenuator to perform the self-test; and
  determine whether the output of the RX sensing hardware is within the functional operating range.

14. The system of claim 9, further comprising:
  a transmission (TX) self-test bus, which comprises a second input to the multiplexer; and
  a TX hardware circuit coupled to the signal bus and to use the sinusoidal drive signal to excite the electrode of the touch panel, wherein the TX hardware circuit comprises:
an operational amplifier to drive the sinusoidal drive signal onto the electrode;
  a second capacitor coupled to an output of the operational amplifier; and
  a switch coupled between the second capacitor and the TX self-test bus.

15. The system of claim 14, wherein the control logic, to perform the self-test on the TX hardware circuit, is further to:
  close the switch so that a TX output of the operational amplifier is transmitted over the TX self-test bus;
  cause the multiplexer to select the TX self-test bus to feed the TX output to the attenuator; and
  in response to the output of the RX sensing hardware not being within the functional operating range, generate a fault alert via the touch panel.

16. The system of claim 14, wherein the multiplexer also receives, as a third input, a second TX self-test bus that is coupled to at least a second TX hardware circuit.

17. A method of performing a self-test for an device comprising a signal bus that carries a sinusoidal drive signal and receive (RX) sensing hardware, coupled to an electrode of a touch panel, including an attenuator configured to detect a touch signal from the electrode, a multiplexer coupled between an input to the attenuator and the signal bus, and a capacitor coupled between the signal bus and the multiplexer, wherein the method of performing the self-test comprises:
  causing the RX sensing hardware to be disconnected from the electrode;
  causing the multiplexer to couple the capacitor to the input of the attenuator; and
  determining whether an output of the RX sensing hardware is within a functional operating range.

18. The method of claim 17, further comprising:
  triggering the self-test in response to detecting receipt of the touch signal; and
  in response to the output not being within the functional operating range, at least one of:
    ceasing to report touch signals received from the electrode; or
    generating a fault alert via the touch panel.

19. The method of claim 17, wherein the device further comprises a switch coupled between the electrode and the RX sensing hardware, and the method further comprises causing the switch to open to disconnect the RX sensing hardware from the electrode.

20. The method of claim 17, wherein the device further comprises a transmission (TX) self-test bus, which comprises a second input to the multiplexer, and a TX hardware circuit to use the sinusoidal drive signal to excite the electrode of the touch panel, wherein the TX hardware circuit comprises an operational amplifier to drive the sinusoidal drive signal onto the electrode, a second capacitor coupled to an output of the operational amplifier, and a switch coupled between the second capacitor and the TX self-test bus, wherein the method further comprises:
  causing the switch to close so that a TX output of the operational amplifier is transmitted over the TX self-test bus;
  causing the multiplexer to select the TX self-test bus to feed the TX output to the attenuator; and
  in response to the output of the RX sensing hardware not being within the functional operating range, generating a fault alert via the touch panel.

* * * * *